United States Patent [19]

Dever

[11] 3,930,202

[45] Dec. 30, 1975

[54] FUNCTION GENERATOR CIRCUIT

[75] Inventor: John Alden Dever, London, England

[73] Assignee: Honeywell Inc., Minneapolis, Minn.

[22] Filed: June 11, 1973

[21] Appl. No.: 368,657

[30] Foreign Application Priority Data

June 9, 1972 United Kingdom.............. 26941/72

[52] U.S. Cl. ................. 328/142; 328/145; 307/229

[51] Int. Cl.[2] ........................................ G06G 17/12

[58] Field of Search.................... 328/142, 143, 144; 307/229, 230; 235/197

[56] References Cited

UNITED STATES PATENTS

| | | | |
|---|---|---|---|
| 3,436,559 | 4/1969 | Wajs | 328/142 |
| 3,514,635 | 5/1970 | Gilbert | 328/142 |
| 3,736,515 | 5/1973 | Kadron et al. | 328/143 |
| 3,757,234 | 9/1973 | Ohlson | 328/142 |

*Primary Examiner*—John S. Heyman
*Assistant Examiner*—B. P. Davis
*Attorney, Agent, or Firm*—Arthur H. Swanson; Lockwood D. Burton; Mitchell J. Halista

[57] ABSTRACT

A function generator has two sets of biased rectifying circuits connected in parallel between an input and an output. For a steadily increasing input voltage, a first group of similarly poled rectifying circuits switch off in sequence. Subsequently, for a continuing increase in the input voltage, a second group of rectifying circuits poled oppositely to the first group switch on in sequence. Their outputs are summed, via an inverting circuit, to generate a function generator output characteristic (output voltage verses input voltage) of six segments, concave upwards. In addition, there is a non-rectifying circuit connection via a resistor from input to output of the function generator giving a straight-line characteristic which is added to the characteristic of the rectifying circuits to give a resultant characteristic which can provide a uniformly increasing slope with an increasing input signal. The central part of the output characteristic is arranged, by the addition of the straight-line characteristic, to pass to one side of the origin across the input equals zero line. Since the errors in any segment of a characteristic depend on how many of the rectifying circuits are switched on, the errors are therefor cumulative from the center of the output characteristic outwards in both directions, instead of from one end to the other, and the maximum errors are thus reduced.

3 Claims, 5 Drawing Figures

FIG. 1A.
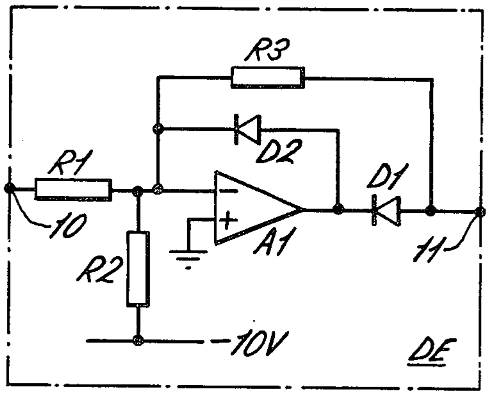
FIG. 2A.
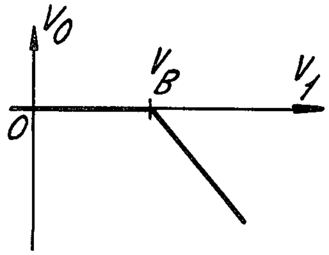
FIG. 3.
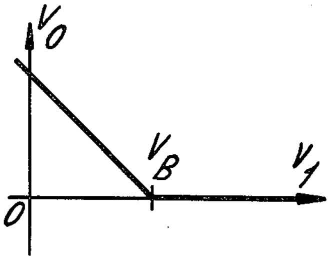
FIG. 1B.
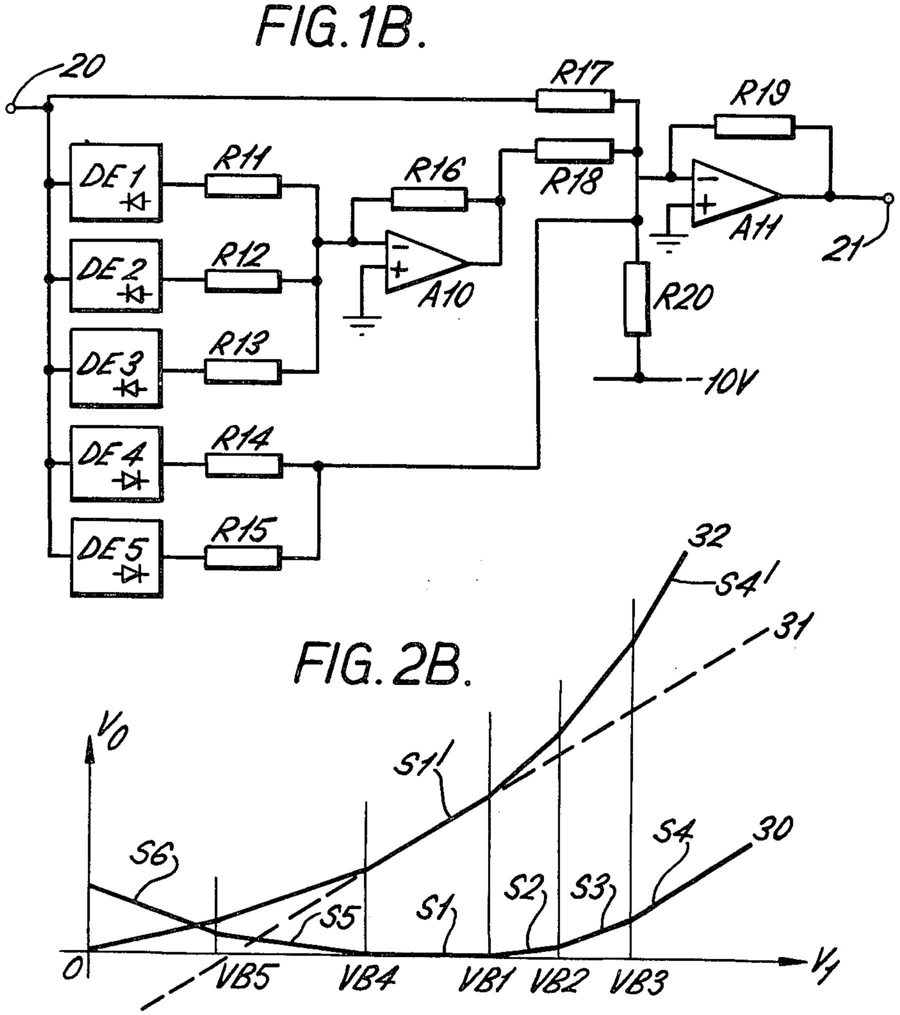
FIG. 1B, FIG. 2B.

FUNCTION GENERATOR CIRCUIT

BACKGROUND OF THE INVENTION

1. Field of the Invention

The present invention relates to function generator circuits, which are circuits having an input-output characteristic which can be set to approximate to a given curve.

2. Description of the Prior Art

One standard technique for constructing such a function generator is to form the desired characteristic as a number of (straight) segments. For each segment, a diode is fed with the input signal and a bias signal, so that it turns on at a specific voltage. The outputs of the individual diode circuits are combined by a summing circuit, so that their respective characteristics are summed to form the desired segmental characteristic. The slope of the first segment of the characteristic is determined by the conductance of the summing resistor fed by the first diode to turn on; the slope of the second segment, by the total conductance of the summing resistors fed by the first and second diodes to turn on; and so on.

Conveniently, a diode equivalent circuit or rectifying circuit may often be used instead of a real diode, the circuit being designed to approximate to an ideal diode more closely than real diodes do, and ideal diode switching between zero and infinite resistance at precisely zero volts. A suitable circuit is described below, and has the further desirable property that the bias signal may be fed in via a resistor to a summing junction without affecting the amplitude of the output signal.

In many instances, a function generator of predetermined characteristic is required, to meet a known requirement with an accuracy of, e.g., 0.1%. In such a case, the values of the component resistors of the summing circuit and the rectifying circuits are predetermined, the accuracy of the resistors being suitably chosen. A difficulty exists, however, since the accuracy with which the last segment of the characteristic is realised is dependent on the cumulation of the errors of all the individual rectifying circuits and summing resistors. Thus if there are say 10 segments, the individual errors of each rectifying circuit will be cumulative and if they are within the permitted limits for the last segment, they will be much smaller than need be achieved for the first segment. The object of the present invention is to achieve a partial alleviation of this difficulty.

SUMMARY OF THE INVENTION

Thus, according to the present invention, there is provided a function generator comprising a plurality of rectifying circuits connected in a parallel between the input and a summing circuit, each biassed to conduct with a particular resistance at a particular input voltage, so that the characteristics of the rectifier circuits thereby sum to form a combined characteristic of segmental form, and including a non-rectifying biassed connection from the input to the summing circuit, having a straight characteristic which coincides with a representative or substantially central segment of the combined characteristic, the characteristics of the rectifying circuits thus summing with the straight characteristic on one or other sides of the central segment of the combined characteristic.

BRIEF DESCRIPTION OF THE DRAWINGS

An embodiment of the invention will now be described, by way of example, with reference to the accompanying drawings, in which:

FIG. 1A is a circuit diagram of a rectifying circuit;

FIG. 1B is a circuit diagram of a function generator; and

FIGS. 2A, 2B, and 3 are graphs of the characteristics of the circuits of FIGS. 1A, 1B, and a modification of FIG. 1A respectively.

DESCRIPTION OF THE PREFERRED EMBODIMENT

Referring first to FIG. 1A, a rectifying circuit or diode equivalent circuit DE has its input terminal 10 feeding an operational amplifier A1 via a summing resistor R1 and with a biasing resistor R2 connected to a −10 V supply. A diode D2 is connected across A1 to give a negative feedback, and A1 also feed an output terminal 11 via another diode D1, with resistor R3 giving negative feedback from the output terminal to the input of A1. In operation, it is evident that any negative signal at the input of A1 will give a positive signal at its output, turning diode D2 on, so that the input of A1 is thus held near zero. If the input to A1 goes positive, the output will go negative turning diode D1 on, and feedback through resistor R3 will occur. If, as is often the case, resistors R1 and R3 have the same value, it follows that in these circumstances any change in the output at terminal 11 will be exactly equal and opposite to a change in the input at terminal 10. Resistor R2 adds a bias voltage, so that the input to A1 will be zero for some positive voltage at terminal 10. The circuit DE thus has a characteristic as shown in FIG. 2A, where $V_1$ and $V_0$ are the input and output voltages, the so-called break point voltage $V_B$ is 10 $R_1/R_2$, and the slope of the characteristic beyond the break point is $-R_3/R_1$.

A circuit identical to that of FIG. 1A except that the diodes are poled oppositely will have the characteristic shown in FIG. 3.

Referring now to FIG. 1B, an input terminal 20 is connected to three parallel rectifying circuits DE1, DE2, and DE3 each as shown in FIG. 1A. Their outputs are connected through respective resistors R11, R12, and R13 to an operational amplifier A10, having a feedback resistor R16. Referring to the right-hand end of graph 30 of FIG. 2B, if the rectifying circuits DE1 to DE3 have break points VB1 to VB3 respectively, their combined characteristic will be as shown by segments S1 to S4 (amplifier A10 giving an inversion in addition to that occurring in the rectifying circuits). It will be realised that the errors of the three rectifying circuits are cumulative in segment S4.

This characteristic 30 may be extended to the left of segment S1, as shown, to give segments S5 and S6, by including the two further rectifying circuits DE4 and DE5 whose outputs are not inverted but are combined with the output of amplifier A10 via respective summing resistors R14 and R15. Circuits DE4 and DE5 have their diodes poled oppositely from those shown in their blocks in FIG. 1B.

The system as so far described is a known type of function generator, in which the output characteristic is based on a horizontal segment and each successive segment from that is generated by the combined effect of the rectifying circuits for all previous segments and a rectifying circuit for that segment. If the required characteristic is as shown by graph 32, this means that the last segment S4' will be produced by the cumulative effects of six rectifying circuits, all of whose errors will be additive.

In the full circuit shown, amplifier A11 is fed with the outputs of rectifying circuits DE4 and DE5 via summing resistors R14 and R15, with the output of amplifier A10 via resistor R18, and also with the input signal relatively directly through resistor R17, i.e., through a non-rectifying path. Amplifier A11 also has a negative feedback resistor R19 and a bias resistor R20. Considering first the resistors R17, R19, and R20, these give a characteristic as shown by graph 31, where the ratio R19/R17 determines the slope and the ratio R17/R20 determines the offset from the origin. (The inversion produced by amplifier A11 is ignored to simplify the comparison of the graphs in FIG. 2B.) Resistors R14, R15, and R18 effect the addition of the characteristic of graph 30, giving the combined characteristic shown by graph 32. With this arrangement, the worst case for error is segment S4', in which the errors of only three rectifying circuits (DE1 to DE3) are cumulative.

More generally, with a large number of segments the invention permits the reduction of cumulative errors by about half. It will be realised, of course, that any segment reasonably remote from both ends of the combined characteristic may be regarded as the central one; for example, with 9 segments, it may be convenient to designate the 4th segment as the central one instead of the 5th. It will also be realised that the arrangement of the rectifying circuits (DE1–5) and the summing circuitry (R11–20, A10, and A11) is susceptible to many variations of detail.

What we claim is:

1. A function generator comprising an input terminal, a signal summing circuit, a plurality of signal rectifying circuits connected in parallel between said input terminal and said summing circuit; each of said signal rectifying circuits including biasing means for biasing a corresponding one of said signal rectifying circuits to conduct with a particular resistance at a particular input voltage so that the characteristics of said signal rectifying circuits thereby sum to form a combined characteristic of segmental form, and including a non-rectifying signal circuit connection from said input terminal to said summing circuit having a straight line characteristic which coincides with a representative or substantially central segment of the combined characteristic and which passes through the input equals zero line to one side of the origin of the input equals zero line, the characteristics of said rectifying circuits thus summing with the straight line characteristic of the non-rectifying circuit on a corresponding side of the central segment of the combined characteristic.

2. A function generator according to claim 1 wherein each rectifying circuit comprises an operational amplifier, a first resistor connecting the input of the rectifying circuit to the inverting input of the amplifier, a second resistor biassing the amplifier, a first diode connecting the output of the amplifier to the output of the rectifying circuit, a second diode connecting the output of the amplifier to its inverting input, the two diodes having unlike electrodes connected together, and a third resistor connecting the output of the rectifying circuit to the inverting input of the operational amplifier.

3. A function generator according to claim 2 wherein the rectifying circuits are divided into two sets, those of each set having their diodes similarly poled and the diodes being oppositely poled in the two sets, and wherein the summing circuit includes a first circuit which sums the outputs of the rectifying circuits of the first set and a second circuit portion which sums and inverts the outputs of the rectifying circuits of the second set.

* * * * *